United States Patent [19]
Golden

[11] Patent Number: 4,603,747
[45] Date of Patent: Aug. 5, 1986

[54] APPARATUS FOR REMOVING INTERNAL TILES FROM CHIMNEYS

[76] Inventor: James M. Golden, P.O. Box 176, Doswell, Va. 23047

[21] Appl. No.: 701,915

[22] Filed: Feb. 14, 1985

[51] Int. Cl.[4] .......................... B23B 45/16; B08B 1/00
[52] U.S. Cl. .................................... 173/94; 15/104.07; 15/249; 173/81
[58] Field of Search ............................. 173/94, 81, 82; 15/104.3, 104.07, 242, 243, 249

[56] References Cited

U.S. PATENT DOCUMENTS 3,101,499 8/1963 Greenfield ........................ 15/104.07
3,302,976 2/1967 Grant ........................... 15/104.07 X
4,433,736 2/1984 Layotte et al. ........................ 173/94
4,528,040 7/1985 Vickery ........................ 15/104.07 X

*Primary Examiner*—E. R. Kazenske
*Assistant Examiner*—Willmon Fridie, Jr.
*Attorney, Agent, or Firm*—Norman B. Rainer

[57] ABSTRACT

Apparatus is provided for removing the interior tile lining from brick chimneys. The apparatus includes an assembly that is lowered into the chimney, the assembly comprising a reversible electric motor mounted within a frame, and a weighted impact member driven by the motor in a horizontal circular path. An impact-absorbing clutch protects the motor from mechanical shock, and keeps the weight of the impact member from pulling downwardly on the rotor of the motor.

8 Claims, 4 Drawing Figures

APPARATUS FOR REMOVING INTERNAL TILES FROM CHIMNEYS

BACKGROUND OF THE INVENTION

This invention relates to the restoration of chimneys, and more particularly concerns apparatus for removal of the interior tiles from chimneys in preparation for the replacement of said tiles with a cementitious coating.

Most brick chimneys which vent combustion gases upwardly away from a fireplace or stove are provided with an internal lining of smoothsurfaced refractory terracotta tiles bonded to an outer layer of bricks. The tiles provide a relatively smooth surface which will not collect and accumulate smoke components, and permits easy periodic cleaning. In the course of tire, weathering effects, foundation settling, and chimney fires cause cracks to develop and extend into the exterior of the chimney. Such cracks impair the effectiveness of the chimney, and give cause for repair of the chimney.

Repair of cracked chimneys is generally accomplished by applying a continuous cementitious coating to the interior of the chimney which seals the cracks and imparts some rigidifying strength to the chimney. However, in order to apply said coating, the interior tiles must be removed. Otherwise the coating may not be sufficiently adherent, and its added thickness would constrict the open interior passageway of the chimney.

In the past, removal of the tiles has been accomplished manually by a worker positioned above the top of the chimney and using a long, heavy pipe having a chisel-like edge at its bottom. By repeatedly raising the pipe and thrusting it downwardly to strike at the bonded interface of the tile and brick, the tiles are broken away from the brick in the form of small fragments which fall into the fireplace, from which they are removed for disposal. Such procedure is, however, a time consuming and dangerous activity. Furthermore, inaccurate impacts by the pipe can cause destructive consequences to the outer brick work. Additional damage is also caused when whole pieces of tiles fall onto the underlying damper structure of the fireplace.

Mechanical devices have been disclosed for cleaning the interior of chimneys. Such devices generally involve motor driven brushes or abrading means which are lowered into the chimney for the purpose of removing caked residue from the tiles. Mechanical devices for removing the tiles in an effective manner have not heretofore been disclosed.

Accordingly, it is an object of the present invention to provide motor-driven apparatus for removing tiles from the interior of a chimney.

It is another object of this invention to provide apparatus of the foregoing object having the ability to produce impacting force which breaks said tiles as they are removed from the chimney.

It is a further object of the present invention to provide apparatus of the aforesaid nature capable of being lowered into the interior of a chimney.

It is still another object of the invention to provide apparatus of the aforesaid nature of simple and rugged construction which may be economically manufactured.

These objects and other objects and advantages of the invention will be apparent from the following description.

SUMMARY OF THE INVENTION

The above and other beneficial objects and advantages are accomplished in accordance with the present invention by a heavy duty rotary impacting apparatus comprising:

(a) an electric motor capable of reversing directions of rotation, (b) a protective frame upon which said motor is mounted, (c) a drive shaft extending downwardly from said motor to a lowermost extremity, (d) impact-absorbing clutch means associated with the lowermost extremity of said drive shaft, (e) an extension shaft axially aligned with said drive shaft, having an upper extremity engaged by said clutch means, and a lowermost extremity, (f) a universal joint associated with the lowermost extremity of said extension shaft, (g) a pivoted shaft attached to said universal joint and extending downwardly to a lowermost extremity, (h) weighted impact means associated with the lowermost extremity of said pivoted shaft and adapted to travel in a circular path extending beyond said frame, (i) means for vertically lowering and raising said frame, and (j) electrical control means for starting, stopping and reversing said motor.

In preferred embodiments, the impact means is mounted in an imbalanced manner upon the pivoted shaft, thereby intensifying its rotary motion. Deflector means, preferably of curved contour, may be associated with the lowermost extremity of the frame to aid its downward passage in close-fitting engagement with the interior of a chimney.

A guide ring having a circular aperture may be positioned below said extension shaft in a plane perpendicular to the axis thereof, said guide ring being supported to an adjustable distance below said universal joint. The pivoted shaft rotates within the circular aperture of the guide ring. The circular radius of motion of the impact means is therefore controlled by the distance of said guide ring below the universal joint. Such adjustability of the radius of the impact means enables the apparatus to function effectively in chimneys of different interior sizes.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
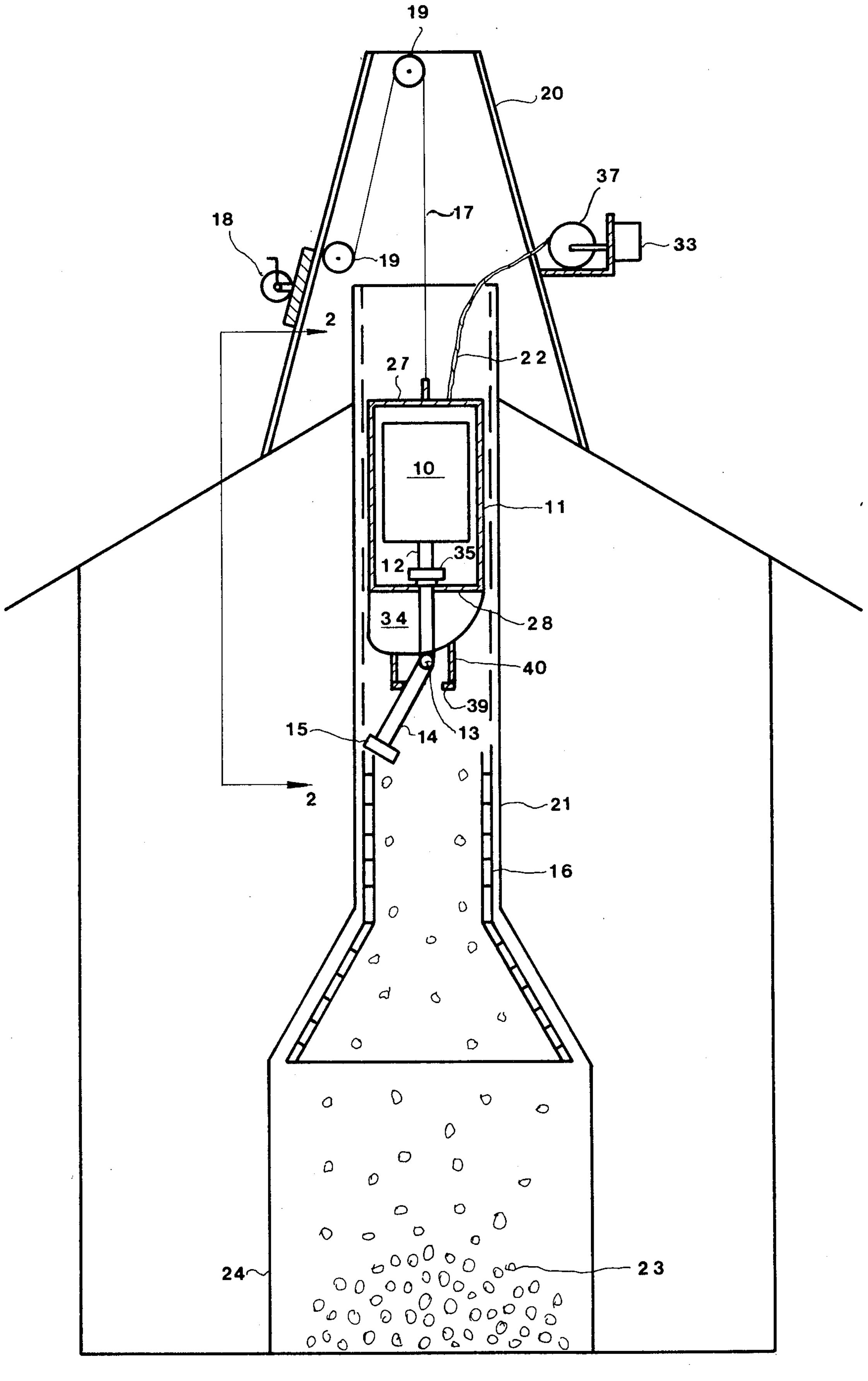
FIG. 1 is a side view of an embodiment of the apparatus of this invention shown in operative association with the interior of a tilelined chimney.
Figure 2:
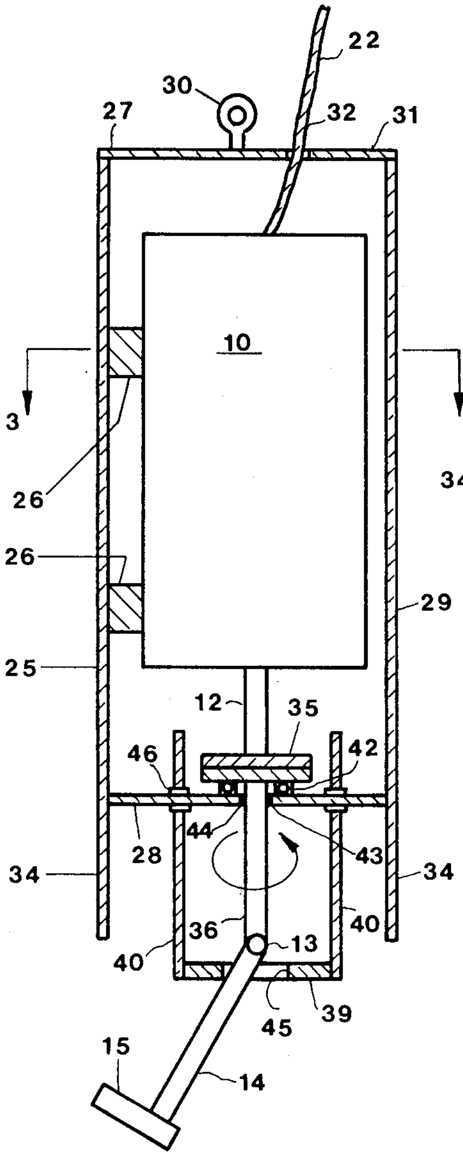
FIG. 2 is an enlarged fragmentary side view taken in the direction 2—2 of FIG. 1.
Figure 4:
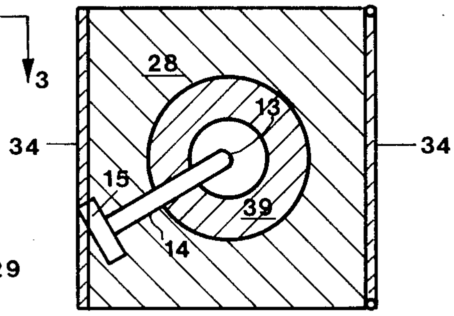
FIG. 4 is a bottom view of the embodiment of FIG. 2.
Figure 3:
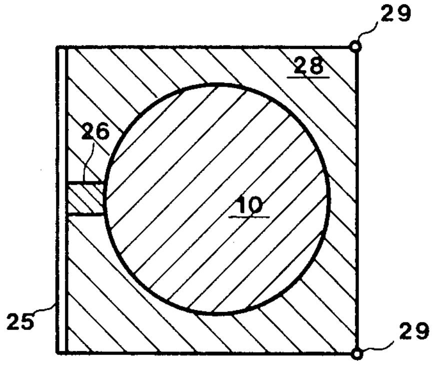
FIG. 3 is a sectional view taken along the line 3—3 of FIG. 2.

Referring to the drawing, an embodiment of the apparatus of the present invention is shown comprised of a pendant assembly comprising electric motor 10 mounted within protective frame 11. The electric motor has a power rating in the range of ½ to 1 horsepower, and is designed to operate in either rotative direction. The frame is comprised of rectangular baseplate 25 of plate steel construction, to which the motor is attached by way of shock-absorbing mounting blocks 26. A steel headplate 27 of square perimeter is welded to the upper extremity of baseplate 25, apertured steel end plate 28 is welded to the lower extremity of said baseplate, and paired longitudinal rods 29 extend between said headplate and end plate in joined relationship therewith. The protective frame has a substantially rectangular box-like configuration dimensioned to fit very closely about the motor.

A holding eye 30 is welded to upper face 31 of head plate 27. Said eye facilitates attachment of cable 17 which supports the pendant assembly. An aperture 32 is disposed in the head plate to permit passage of electrical cable 22 communicating between the motor and control box 33. Deflector means in the form of paired curved steel plates 34 extend downwardly from end plate 28. The purpose of the deflector means is to facilitate downward gliding passage of the motor and housing assembly through the interior of a chimney which may have protuberances or a non-straight configuration.

A drive shaft 12 extends downwardly from the motor to a lowermost extremity affixed to clutch 35 which is supported by thrust bearing 42 positioned atop end plate 28. The clutch serves to protect the motor from the shock of hard stopping conditions such as the sudden binding of the apparatus by debris in the chimney. The clutch further serves to prevent the weight of downward components from acting directly upon the motor, and additionally insulates the motor from excessive vibration. Extension shaft 36 emerges from said clutch in axial alignment with drive shaft 12 and extends through sleeve bearing 43 within aperture 44 in plate 28. The lowermost extremity of extension shaft 36 is attached to universal joint 13. Pivoted shaft 14 is pendantly supported by said universal joint. The free lowermost extremity of shaft 14 supports breaker bar 15 comprised of a case hardened steel rod mounted in an imbalanced manner to shaft 14. The length of shaft 14 and the configuration of breaker bar 15 is such as to enable the breaker bar to rotate in a substantially horizontal plane in a circular path having a diameter greater than the rectangular cross-sectional configuration of the frame. The actual path taken by the breaker bar will however be erratic due to its impacting interaction with the tiles of the chimney.

A guide ring 39 of hardened steel having a centered circular aperture 45 is disposed below end plate 28 in parallel juxtaposition thereto. The guide ring is supported by threaded rods 40 which penetrate apertures in said end plate, and are secured thereto at adjustable degrees of penetration by lock nuts 46 while maintaining ring 39 below universal joint 13. By virtue of its restraining effect upon pivoted shaft 14, said guide ring controls the rotational diameter of the breaker bar. The rotational diameter can be adjusted to the needs of chimneys of different interior dimensions by vertically adjusting rods 40.

Means for raising and lowering the motor and frame assembly held by cable 17 are comprised of a winch mechanism 18 and pulley wheels 19 associated with a scaffold support 20. Electric cord 22 is stored on a reel 37 capable of supplying and retrieving adequate lengths of said electric cord. The extremity of electric cord 22 is connected to control box 33, and is electrically wired in a manner such that the motor can be turned on and off and reversed in direction. The reversal capability is needed to occasionally free the breaker bar which may become jammed in debris. Suitable indicator lights may be present on the control box as safety features. Electric lights may also be connected to the control box, or otherwise associated with the apparatus to facilitate observation of the function of the pendant assembly within the chimney.

In operation, the pendant assembly is lowered into the interior of a chimney 21. The breaker bar rotatively strikes tiles 16, causing them to break and dislodge from the chimney. The debris 23 from the tiles accumulates in the fireplace 24. It is important that the pendant assembly be of considerable weight because such weight prevents reactional rotation from the motion of the breaker bar.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A heavy duty apparatus for removing the interior tiles from chimneys by rotary impaction comprising:
(a) an electric motor capable of reversing directions of rotation,
(b) a protective frame upon which said motor is mounted,
(c) a drive shaft extending downwardly from said motor to a lowermost extremity,
(d) impact-absorbing clutch means associated with the lowermost extremity of said drive shaft,
(e) an extension shaft axially aligned with said drive shaft, having an upper extremity engaged by said clutch means, and a lowermost extremity,
(f) a universal joint associated with the lowermost extremity of said extension shaft,
(g) a pivoted shaft attached to said universal joint and extending downwardly to a lowermost extremity,
(h) weighted impact means associated with the lowermost extremity of said pivoted shaft and adapted to travel in a circular path extending beyond said frame,
(i) means for vertically lowering and raising said frame, and
(j) electrical control means for starting, stopping and reversing said motor.

2. The apparatus of claim 1 wherein said impact means is mounted in an imbalanced manner upon said pivoted shaft.

3. The apparatus of claim 2 wherein deflector means are associated with the lowermost extremity of said frame to aid the downward passage of the frame in close-fitting engagement with the interior of a chimney.

4. The apparatus of claim 3 wherein said deflector means are comprised of paired plates convexly curved in the downward direction.

5. The apparatus of claim 4 wherein circular guide means are provided to define the rotational diameter of said impact means.

6. The apparatus of claim 5 wherein said guide means surrounds said pivoted shaft and can be adjustably positioned along said shaft.

7. The apparatus of claim 1 wherein said protective frame is of boxlike configuration comprised of a rectangular baseplate, a head plate of square perimeter, an end plate, and paired longitudinal rods extending between said head and end plates.

8. The apparatus of claim 1 wherein the motor and frame assembly is sufficiently heavy to resist reactional rotation which might otherwise be produced by the rotation of the pivoted shaft and impact means.

* * * * *